(No Model.)

G. M. HUFFMAN.
BRAKE LEVER.

No. 314,579. Patented Mar. 31, 1885.

Witnesses:
J. Gardner
Edgar W. Allen

Inventor:
George M. Huffman

UNITED STATES PATENT OFFICE.

GEORGE M. HUFFMAN, OF ZANESVILLE, OHIO.

BRAKE-LEVER.

SPECIFICATION forming part of Letters Patent No. 314,579, dated March 31, 1885.

Application filed December 24, 1884. (No model.)

*To all whom it may concern:*

Be it known that I, GEORGE M. HUFFMAN, a citizen of the United States, residing at Zanesville, in the county of Muskingum and State of Ohio, have invented an Improvement in Locks for Wagons and other Vehicles, of which the following is a specification.

My invention and improvement for and in locks for wagons and other vehicles consists of a combination of a lever, A, having a slot through which a notched quadrant, B, passes, hollow feet C, and pawl D, and arm F, and handle G, and rod H, connecting F and G, to throw the pawl D out of engagement with the quadrant B, all substantially as described.

I accomplish this by the mechanism illustrated in the accompanying drawings, in which similar letters indicate like parts.

Said locks are wholly composed of iron or other metal.

Figure 1:
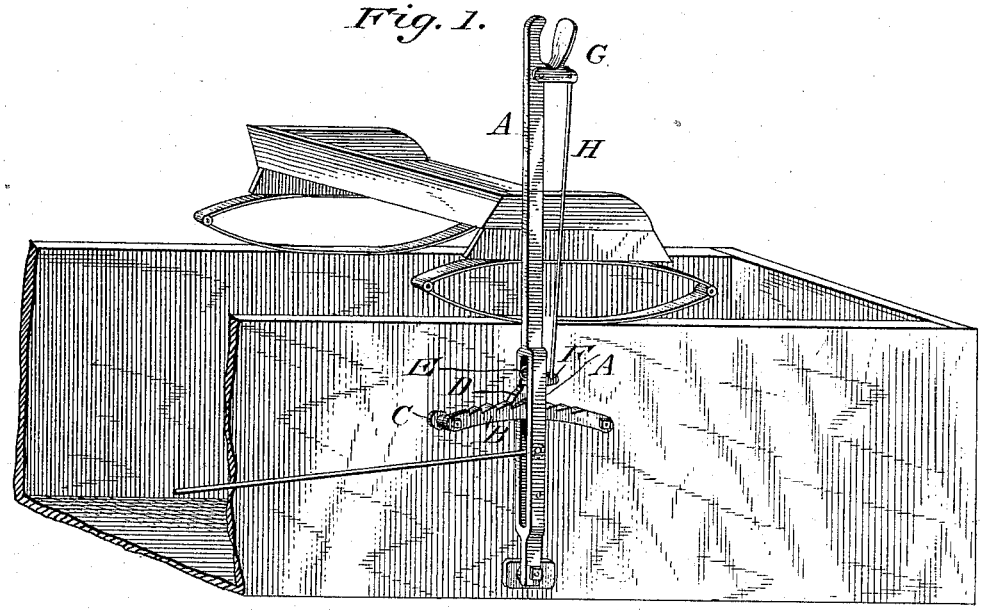
Figure 2:
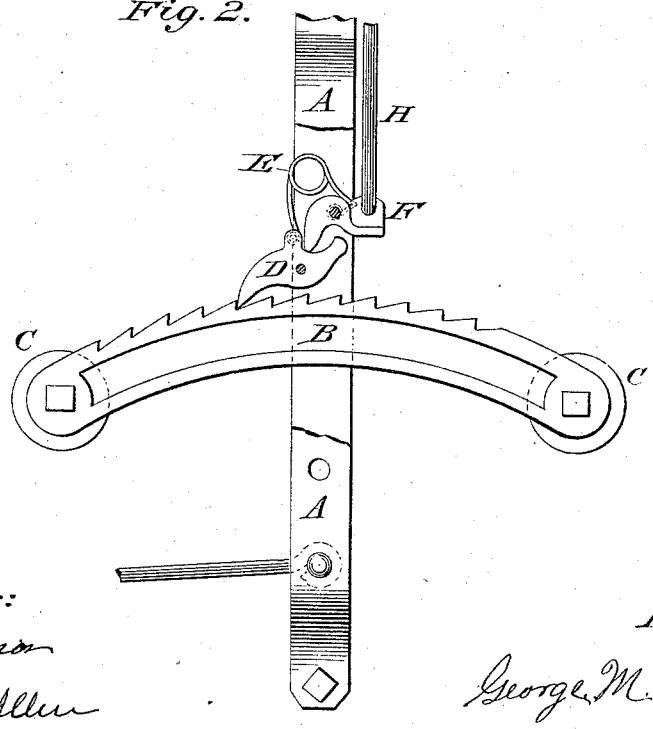

Figure 1 is a perspective of a device embodying my invention. Fig. 2 is an inside view of the same.

A is a lever the lower half of which is made of two pieces of iron or other metal joined at the ends, but spread apart in the middle, forming a slot through which the notched quadrant passes, over which the lever works. The upper part of the lever is one solid piece of iron or other metal welded or otherwise secured to the top of the two pieces composing the lower half, as aforesaid; or it may be cast of malleable iron or other metal in one piece.

B is a notched quadrant with a hole in each end, through which the extension of the feet C passes. C and C are feet, each provided with an extension on one and a hole through the middle parallel with the extension.

D is a pawl riveted in the open space of the lever, above the quadrant B. Its lower end falls into the notches of the quadrant, to lock the lever when drawn tightly.

E is a wire spring which forces the pawl D into the notches of the quadrant B.

F is an arm actuated from above by the handle G, connected to F by the rod H, to throw the pawl D out of engagement with the notched quadrant B, to allow the lever to be thrown back.

H is a rod that connects F and G.

What I claim as my invention and improvement, and wish to secure by Letters Patent, is—

The combination, forming a lock for wagons and other vehicles, consisting of a lever, A, having a slot in the lower half through which a notched quadrant, B, passes, the notched quadrant B having a hole in each end through which the extensions of the feet C pass, feet C, with an extension on one end and a hole through the middle parallel with the extension, the pawl D, the wire spring E, the arm F, the handle G, and rod H, so fashioned that the lock can be attached to either the right or left hand side of the vehicle by changing the feet C from one side of the quadrant B to the other side without changing the position of the lever A on the quadrant B, all substantially as hereinbefore set forth.

GEORGE M. HUFFMAN.

Witnesses:
 EDGAR W. ALLEN,
 JEREMIAH GARDNER.